(12) United States Patent
Murden et al.

(10) Patent No.: US 7,173,470 B2
(45) Date of Patent: Feb. 6, 2007

(54) CLOCK SOURCES AND METHODS WITH REDUCED CLOCK JITTER

(75) Inventors: Franklin M. Murden, Greensboro, NC (US); Ahmed Mohamed Abdelatty Ali, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 68 days.

(21) Appl. No.: 11/078,272

(22) Filed: Mar. 11, 2005

(65) Prior Publication Data

US 2006/0202730 A1 Sep. 14, 2006

(51) Int. Cl.
*G06F 1/04* (2006.01)
(52) U.S. Cl. ......................... 327/291; 327/294; 327/551
(58) Field of Classification Search ................ 327/291, 327/293, 294, 299, 551, 552, 557, 117, 113–115
See application file for complete search history.

(56) References Cited

U.S. PATENT DOCUMENTS

| | | | | | |
|---|---|---|---|---|---|
| 4,389,728 | A | * | 6/1983 | Tsuzuki ....................... | 377/114 |
| 5,168,551 | A | * | 12/1992 | Jeong .......................... | 706/41 |
| 6,008,691 | A | * | 12/1999 | Morita ........................ | 327/552 |
| 6,122,326 | A | * | 9/2000 | Jackson et al. ............. | 375/308 |
| 6,130,564 | A | * | 10/2000 | Wang .......................... | 327/117 |
| 6,163,182 | A | * | 12/2000 | Canard et al. .............. | 327/117 |
| 6,229,357 | B1 | * | 5/2001 | Nair et al. ................... | 327/115 |
| 6,232,905 | B1 | * | 5/2001 | Smith et al. ................ | 341/155 |
| 6,356,129 | B1 | | 3/2002 | O'Brien et al. ............. | 327/175 |
| 6,396,429 | B2 | | 5/2002 | Singer et al. ................ | 341/155 |
| 6,580,383 | B1 | | 6/2003 | Devendorf et al. ......... | 341/143 |
| 6,650,263 | B1 | * | 11/2003 | Dillon ......................... | 341/122 |
| 6,734,748 | B2 | * | 5/2004 | Livezey ...................... | 331/158 |
| 6,816,021 | B2 | * | 11/2004 | Hahn et al. .................. | 331/74 |
| 6,842,054 | B2 | * | 1/2005 | Wang .......................... | 327/115 |

OTHER PUBLICATIONS

Smith, Paul, "Little Known Characteristics of Phase Noise", www.rfdesign.com, Mar. 2004, pp. 46-52.
Sin, Sai-Weng, "Quantitative Noise Analysis of Jitter-Induced Nonuniformly Sampled-and-Held Signals", Faculty of Science and Technology, University of Macau, Macau, China, 4 pages, published Apr. 2003.
Goldberf, Bar-Giora, "The Effects of Clock Jitter on Data Conversion Devices", www.rfdesign.com, Aug. 2002, pp. 26-32.
"Design a Low-Jitter Clock for High-Speed Data Converters", Maxim, Dallas Semiconductor, Nov. 20, 2001, 14 pages.

* cited by examiner

*Primary Examiner*—Timothy P. Callahan
*Assistant Examiner*—Hai L. Nguyen
(74) *Attorney, Agent, or Firm*—Koppel, Patrick & Heybl

(57) ABSTRACT

Clock sources are provided which are especially useful for reducing phase noise in signal samplers that typically provide samples of an analog input signal in signal-conditioning systems such as analog-to-digital converters. This phase noise reduction is realized with the recognition that sampler noise is related to clock jitter by a ratio of the input signal's slew rate to the clock's slew rate. Clock embodiments include a frequency divider and a signal gate. The divider divides a first signal to provide a second signal with a slew rate lowered from the slew rate of the first signal and the gate passes the second signal when commanded by the first signal to thereby generate a clock signal.

24 Claims, 4 Drawing Sheets

CLOCK SOURCES AND METHODS WITH REDUCED CLOCK JITTER

BACKGROUND OF THE INVENTION

1. Field of the Invention

The present invention relates generally to the generation of clock signals.

2. Description of the Related Art

Many electronic systems (e.g., signal conditioning systems such as analog-to-digital converters) include samplers which provide samples of an analog input signal. These samples are then processed to obtain useful output signals (e.g., corresponding digital codes). The samplers generally produce the samples at the rate of a clock signal which is provided by a clock source. Unfortunately, the arrangements of conventional clock sources typically cause pulses of their clock signal to excessively jitter about their intended temporal positions. This excessive jitter induces sampling uncertainty into the samples which degrades the performance (e.g., signal-to-noise ratio) of the systems that process the samples.

BRIEF SUMMARY OF THE INVENTION

The present invention is directed to clock sources and methods that reduce clock jitter. The novel features of the invention are set forth with particularity in the appended claims. The invention will be best understood from the following description when read in conjunction with the accompanying drawings.

DETAILED DESCRIPTION OF THE INVENTION

Clock source embodiments of the invention are described below with reference to FIGS. 1–6. These clock embodiments are especially useful for reducing clock jitter in signal samplers that typically provide samples of an analog input signal in signal-conditioning systems such as analog-to-digital converters. This clock jitter reduction is realized with the recognition that sampler noise is related to clock noise by a ratio of the input signal's slew rate to the clock's slew rate.

Clock embodiments generally include a frequency divider and a signal gate. The divider divides a first signal to provide a second signal with a second frequency lowered from the first frequency of the first signal and the gate passes the second signal when commanded by the first signal to thereby generate a clock signal.

Figure 1:
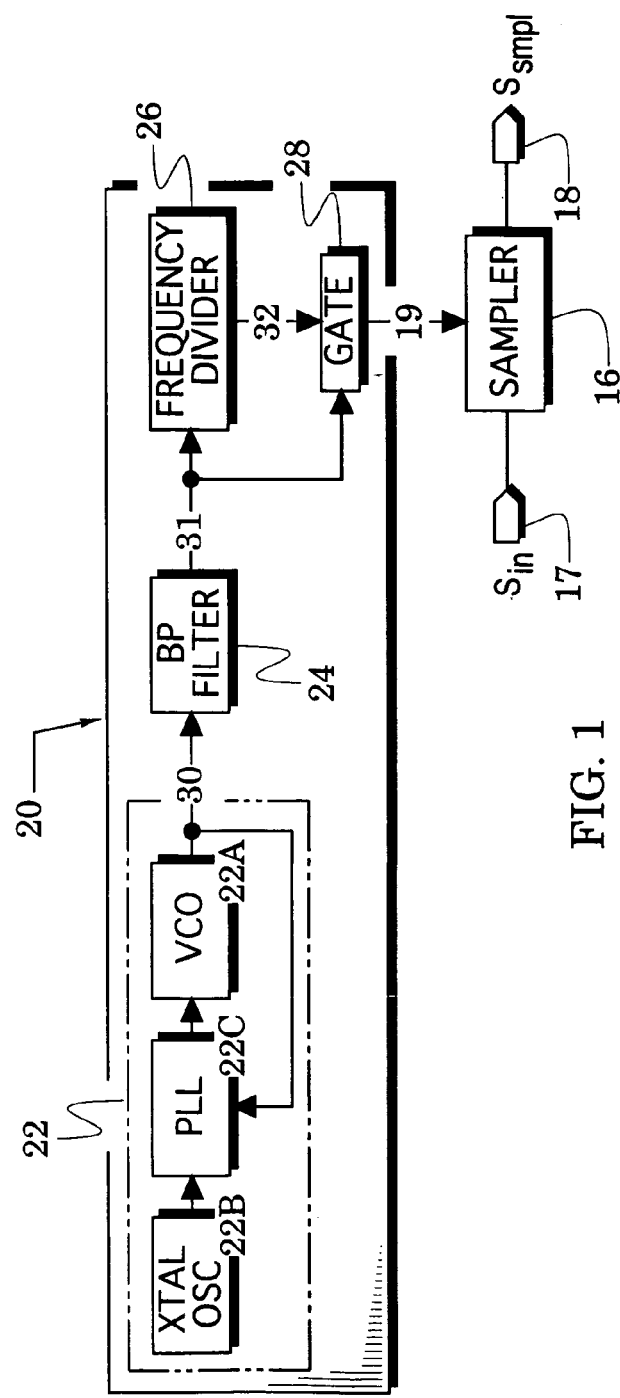
FIG. 1 is a block diagram of a clock source embodiment of the present invention.

In particular, FIG. 1 illustrates a sampler 16 that receives an input analog signal $S_{in}$ from an input port 17 and provides a sample $S_{smpl}$ of the analog signal to an output port 18 in response to each pulse of a clock signal 19 that is received from a clock source embodiment 20. The clock source 20 includes a signal generator 22 and a converter that comprises a bandpass filter 24, a frequency divider 26 and a gate 28.

In operation of the clock source 20, the signal generator generates a first signal 30 whose frequency is significantly elevated above the intended frequency of the clock signal 19 to thereby significantly increase its slew rate. FIG. 1 illustrates a signal generator 22 in which a voltage-controlled oscillator (VCO) 22A is phase locked to a crystal oscillator (XTAL OSC) 22B through a phase-locked loop (PLL) 22C. It is noted, however, that other clock source embodiments 20 may be realized with different embodiments of the signal generator 22.

The first signal is then filtered by the filter 24 to provide a filtered first signal 31 which reduces wideband noise without significantly affecting slew rate. The filtered first signal is coupled to the frequency divider 26 and to the gate 28 via the buffer amplifiers 90.

The divider 26 divides the filtered first signal 31 to provide a second signal 32 whose frequency is the intended frequency of the clock signal 19 (because of their frequency relationship, the first and second signals 31 and 32 could also be respectively referred to as fast and slow signals). Therefore, the second signal 32 has the intended frequency of the clock signal 19 and it is then passed through the gate 28 in response to the higher frequency of the filtered initial signal 31 and this final process provides the clock signal 19.

Clock source embodiments of the invention are structured with the recognition that the sampling process of the sampler 16 irretrievably mixes clock phase noise with the input analog signal $S_{in}$. Each clock noise component at its respective frequency will thus be mixed so that it appears displaced below and above the sample signal by that same frequency. In particular, it is recognized that the sampler noise $N_{smpl}$ at a spectral distance $\Delta f$ is related to the clock noise $N_{clk}$ by the ratio of the input signal slew rate $SR_{in}$ to the clock slew rate $SR_{clk}$ as shown in the following equation $$N_{smpl_{\Delta f}} = \left[\frac{SR_{in}}{SR_{clk}}\right] N_{clk_{\Delta f}} \quad (1)$$

wherein clock noise $N_{clk}$ is the RMS sum of the noise of the signal generator (22 in FIG. 1) and the noise of the gate (28 in FIG. 1). The amplitude of the noise associated with the sample $S_{smpl}$ (at the output port 18 in FIG. 1) can, therefore, be significantly reduced with an increase of the clock slew rate $SR_{clk}$.

Figure 2:
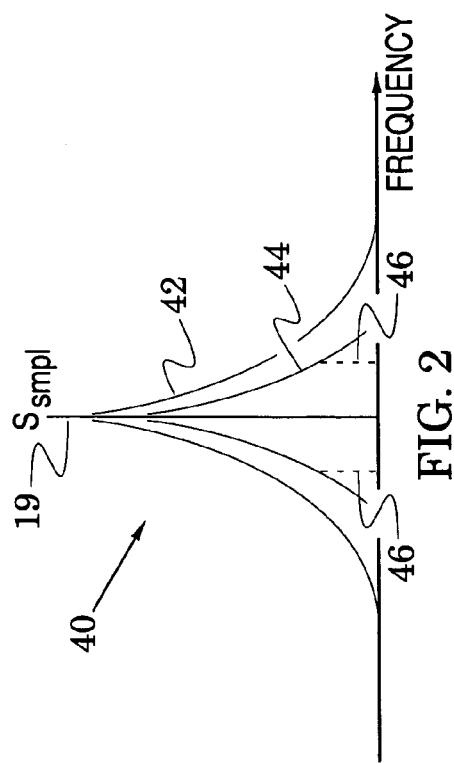
FIG. 2 is a frequency diagram that illustrates phase noise reduction in the source of FIG. 1.

Equation (1) and its relationship to the clock structure of FIG. 1 is illustrated in the graph 40 of FIG. 2 which shows a conventional noise envelope 42 about each side of the sample signal (18 in FIG. 1). Because the second signal 32 of FIG. 1 is gated through the gate 28 by the higher frequency of the filtered initial signal 31, the clock jitter of the resultant clock signal 19 is significantly lowered as indicated by the final noise envelope 44 of FIG. 2. In particular, it is lowered by 20 log N wherein N is the divide rate of the frequency divider 26.

Directing attention to exemplary spectral components 46 of this noise envelope, it is seen that they are significantly reduced from their amplitude in the noise envelope 44. Essentially, the elevated frequency of the initial signal 30 provides an elevated slew rate which operates in accordance with equation (1) and the structure of FIG. 1 to significantly reduce the clock jitter associated with the clock signal 19.

Figure 3:
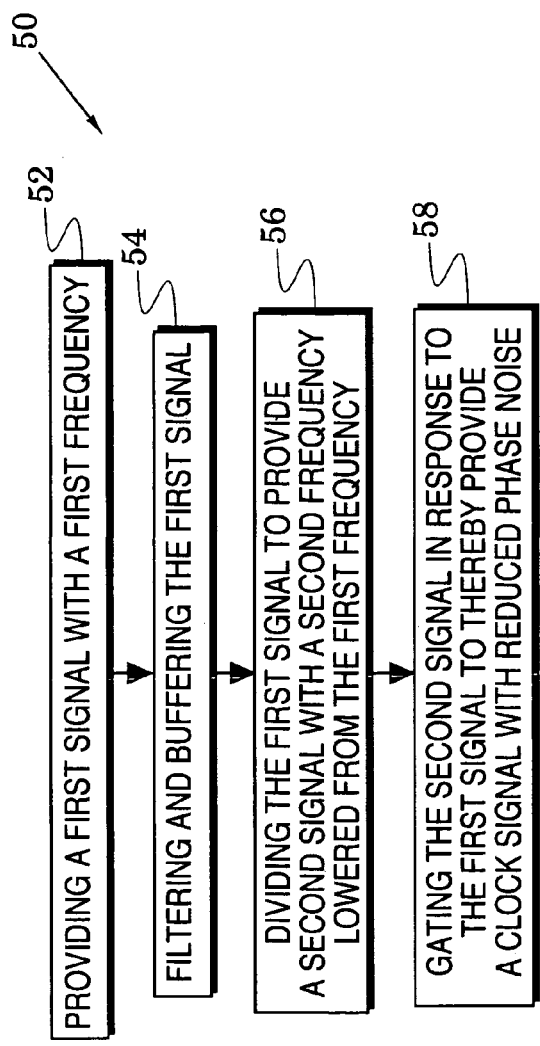
FIG. 3 is a flow chart that presents clock processes in the source of FIG. 1.

Exemplary processes in the clock source 20 of FIG. 1 are shown in the flow chart 50 of FIG. 3. An initial process 52 provides a first signal (30 in FIG. 1) with a first frequency and a process 54 filters and buffers the first signal (to provide a filtered first signal 31). A process 56 then divides the first signal to provide a second signal (32 in FIG. 1) with a second frequency that is lowered from first frequency. In a final process 58, the second signal is gated in response to the first signal to generate a clock signal (19 in FIG. 1) with reduced clock jitter.

Figure 4A:
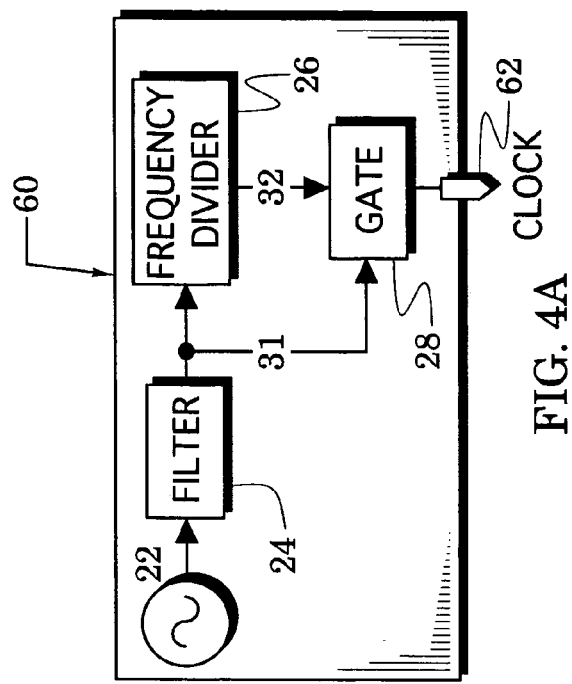
FIGS. 4A and 4B are block diagrams of additional clock source embodiments.

FIG. 4A illustrates a clock source embodiment 60 which uses some of the reference numbers of the clock source 20 of FIG. 1. As shown, the filter 24 filters a first signal that is provided by a signal source 22 to thereby provide a filtered first signal 31. Although the filter maintains the high slew rate of the first signal, it attenuates wide band noise. A frequency divider 26 divides the first signal with its first frequency to a second signal 32 with a lowered second frequency. The second signal is then gated to an output port 62 when the gate 28 responds to altered states of the first signal 31.

Figure 4B:
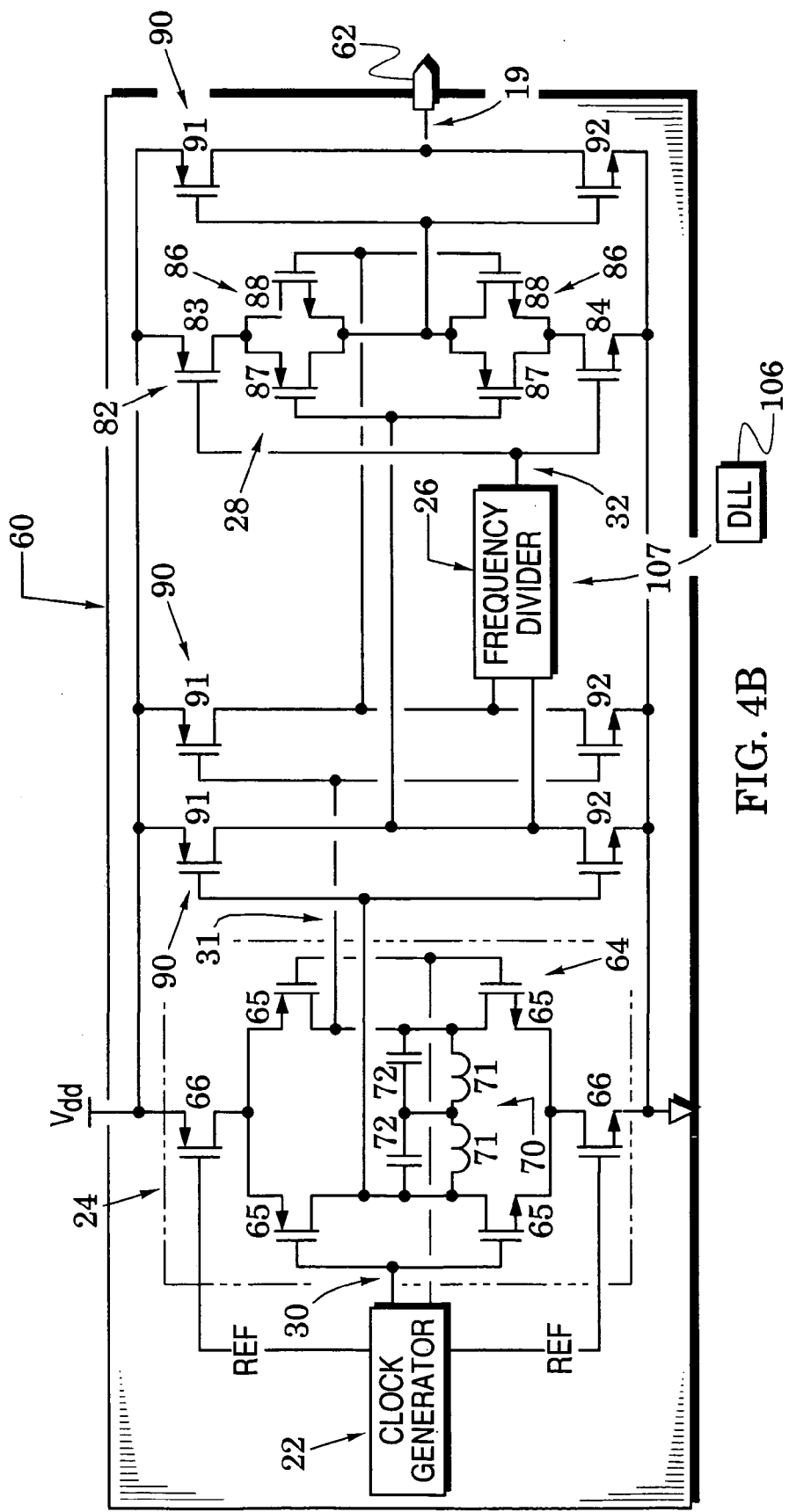

In more detail, FIG. 4B illustrates a clock source embodiment 60 which uses some of the reference numbers of the clock source 20 of FIG. 1. In particular, the clock source 60 includes a signal generator 22 that generates a first signal 30, a filter network 24 that converts the first signal 30 to a filtered first signal 31, and a frequency divider 26 that divides the first signal to provide a second signal 32 with a second frequency reduced from the first signal's first frequency. The source 60 also includes a gate network 28 that passes the second signal when commanded by the first signal. The gate 28 thus generates a clock signal 19 which is available at an output port 62.

In particular, the filter network 24 is an active filter that includes a complementary differential pair 64 of transistors 65, current sources 66 and a filter 70. The current of the current sources is set by reference signals (REF) from the clock generator. The filter 70 comprises inductors 71 and capacitors 72 arranged in parallel and positioned as a load for the complementary differential pair (in the embodiment of FIG. 3, two filter sections are coupled in series as they might be in an integrated circuit to thereby enhance the filter's Q). The complementary differential pair 64 is arranged between the current sources 66 so that it steers their currents through the filter 70 and thus generates the filtered first signal 31 in response to the first signal 30.

The gate network 28 includes an inverter 82 formed by upper and lower inverter transistors 83 and 84 and a pair of transmission gates 86 that are each formed by transistors 87 and 88. Each transmission gate 86 is formed by respectively coupling the source and drain of one of the transistors 87 and 88 to the drain and source of the other of the other of these transistors. The inverter 82 is driven by the second signal 32 from the frequency divider and each of the transmission gates is positioned in an output terminal of a respective one of the inverter transistors.

The transmission gates 86 are turned on and off by the filtered first signal 31 and their outputs are tied together to provide the clock signal 19. Preferably, buffer amplifiers 90 of upper and lower transistors 91 and 92 (joined as inverters) are inserted to couple the filtered first signal 31 to the transmission gates 86 and another buffer amplifier 90 is inserted between the transmission gates and the output port 62.

An exemplary realization of the clock source 60 can be configured for a sampler (16 in FIG. 1) that operates at a sample rate of 100 MSPS (megasamples/second). In this realization, the first signal is a sinusoid of frequency 1600 MHz with an amplitude of approximately 2 volts peak-to-peak. The filter network 24 is configured to have a bandwidth less than ½ of the sample rate (to inhibit noise aliasing) and it increases the signal amplitude to a supply rail-to-rail voltage of approximately 3 volts.

This rail-to-rail signal is further amplified by the subsequent buffer amplifiers 90 into an "amplitude-limited sinusoid" which approaches a square wave shape that substantially enhances the first signal's slew rate. This version of the first signal 31 is shown in the timing diagram 100 of FIG. 5. It is received by the frequency divider 26 which may be formed, for example, with a series of flip-flops in a divide-by-16 arrangement that reduces the frequency of the second signal 32 to 100 MHz. A portion of the resultant second signal 32 is also shown in FIG. 5.

Figure 5:
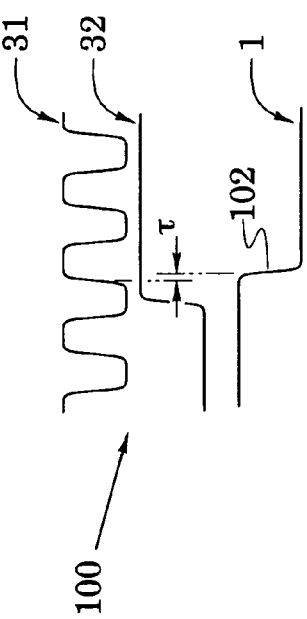
FIG. 5 is a timing diagram that illustrates signal relationships in the source of FIG. 5.

Operation of the clock source 60 of FIG. 4B is illustrated in the timing diagram 100 of FIG. 5. As shown in this diagram, the inverter (82 in FIG. 4A) will invert the second signal 32 to become the clock signal 19 when that clock signal is allowed to pass through the gate 28. The gate, however, is driven by the first signal 31 so that the inverted signal is passed only when the first signal commands the gate 28 to do so.

As shown in FIG. 5, a phase relationship is maintained between the first and second signals 31 and 32 so that the second signal transitions from one state to a different state when the first signal commands the gate 28 to be closed. In particular, the second signal 32 transitions from a low state to a high state at a time when the first signal 31 is low and the gate 28 is closed. As apparent in FIG. 5, the first signal changes states at first times and the second signal changes states at second times that are each positioned between an adjacent pair of said first times. Thus, the clock signal 19 does not transition to a high state until the first signal 31 changes state and opens the gate 28. The output of the inverter (82 in FIG. 4 A) is now passed through the gate 28 so that the clock signal transitions with a rising edge 102 to its high state.

Although the gate 28 is very fast, it does introduce a slight time delay τ between the transition of the first signal 31 and the rising edge 102. As the gate 28 is subsequently turned on and off, the clock signal 19 remains low in response to the inverter action of the inverter 82 which is responding to the slower second signal 32. It is not shown in FIG. 5 but the inverter 82 will subsequently invert the second signal 32 back to a low state. Again, this transition will not appear in the clock signal 19 until the second signal 31 turns on the gate 86.

In this clock operation, it is important to note that the rising edge 102 in FIG. 5 (and the subsequent falling edge) is generated with the transmission gates 86 in response to the high slew rate edges of the first signal 31. Accordingly, the high slew rate of the first signal is thus used to generate a clock signal 19 with exceptionally low clock jitter.

It was noted above that the clock operation illustrated in FIG. 5 requires an appropriate phase relationship between the first and second signals 31 and 32. This relationship can be maintained with various conventional structures. For example, gates in the frequency divider 26 of FIG. 4B can be arranged so that the first signal 31 "reclocks" the second signal 32 in the required phase relationship as it exits the frequency divider. In a second example, the delay-locked loop (DLL) 106 of FIG. 4B can be incorporated into the frequency divider 26 (as indicated by the incorporation arrow 107) to maintain this required phase relationship.

In the exemplary operation described above, it was assumed that the sampler 16 in FIG. 1 operated at a sample rate of 100 MSPS. If an input analog signal Sin is received at 225 MHz, for example, the sample signal $S_{smpl}$ will be aliased down to 25 MHz in the first Nyquist zone and the bandwidth of the filter network 24 is preferably set less than 50 MHz to inhibit aliasing of the phase noise of the clock generator 22.

It was further assumed that the first signal 31 had a frequency of 1600 MHz and the second signal 32 had a frequency of 100 MHz so that the divider ratio N of the frequency divider 26 was equal to 16. Because of the operation described above, the slew rate of the first signal 31 will be transferred to the second signal 32 as it is gated through the gate network 28 to generate the clock signal 19 at the output port 62. Equation (1) shows that phase noise of the sample signal (at port 18 in FIG. 1) will be reduced by the increase in the clock slew rate $SR_{clk}$. Accordingly, the phase noise of the sample signal $S_{smpl}$ will be reduced by 20 logN=20 log 16 or approximately 24 dB.

In contrast to source embodiments of the invention, some conventional clock sources generate an oscillator signal $S_{osc}$ with a crystal oscillator (e.g., a 100 MHz crystal oscillator) and couple this signal through a string of inverters to provide an "amplitude-limited sinusoid" which is then passed through a bandpass filter centered about the oscillator signal $S_{osc}$. In the signal squaring process of the string of inverters, however, continuous phase noise is limited to the edges of the amplitude-limited sinusoid Accordingly, the bandpass filter fails to filter the oscillator signal $S_{osc}$ as might have been expected and the jitter of the clock signal is substantially degraded. It is noted that the filters of the clock source embodiments of FIGS. 1, 4A and 4B are more effective because they operate on the sinusoidal signal of the clock generator 22. The filter bandwidth is preferably restricted to be less than ½ of the frequency of the clock signal to prevent aliasing noise during the sampling process.

In another important feature of source embodiments of the invention, this clock jitter reduction can be realized with filter networks (24 in FIGS. 1 and 4A) whose quality factor Q is no greater than that used in conventional clock sources. This follows because it is increased clock slew rate that reduces sampler phase noise rather than narrower filter bandwidth.

Figure 6:
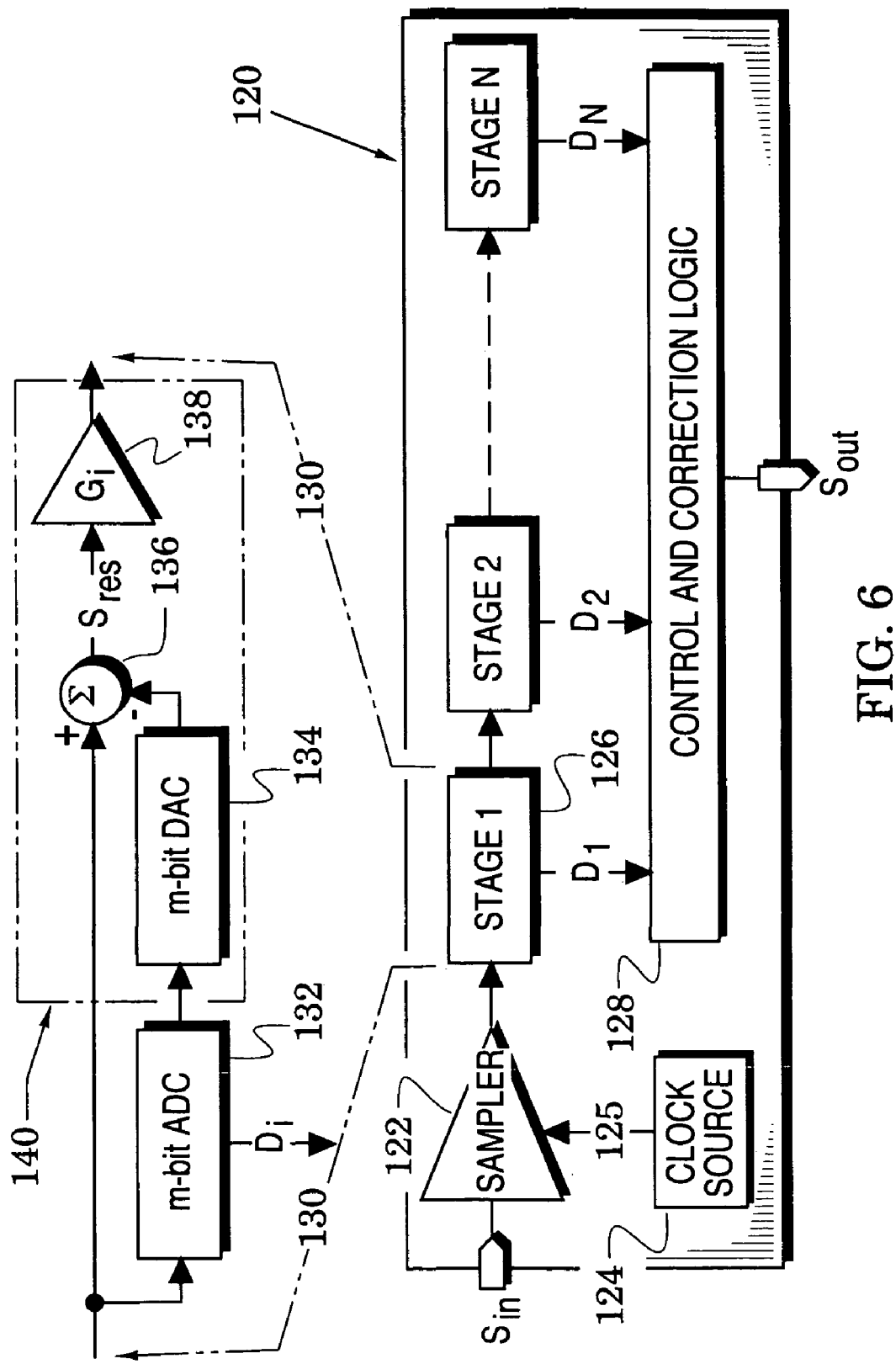
FIG. 6 is a block diagram of an analog-to-digital converter that can incorporate clock embodiments of the invention.

Clock source embodiments of the invention are especially useful in signal-conditioning systems such as the pipelined analog-to-digital converter 120 of FIG. 6 which includes a sampler 122 that provides samples of an analog input signal $S_{in}$ in response to the clock signal 125 of a clock source 124. The samples are provided to N cascaded converter stages 126 that successively convert each sample to a corresponding digital output signal $S_{out}$. Each pipelined stage 126 converts a respective analog signal to that stage's predetermined number of digital bits and passes an amplified residue signal $S_{res}$ to a succeeding converter stage 126.

As each succeeding stage converts its received residue signal, the preceding stage is converting a succeeding analog input signal. All converter stages, therefore, are simultaneously converting succeeding analog input signals to their respective digital bits with final converted words issuing from an associated control and correction logic 128 at the same rate as the sampling rate in the sampler 122. Because the sampler 122 is provided with a clock signal having reduce clock jitter, the signal-to-noise ratio (SNR) of the converter 120 is significantly enhanced.

Broken expansion lines 130 in FIG. 6 indicate that an exemplary converter stage comprises an analog-to-digital converter (ADC) 132 which provides at least one corresponding digital bit $D_i$ and also comprises a digital-to-analog (DAC) 134 that converts this bit (or bits) to an analog signal which is subtracted in a summer 136 from this stage's respective analog input to form an analog residue $S_{res}$ that is amplified in a respective amplifier 138 with a respective gain G and passed to a successive converter stage for further conversion.

The DAC 134, summer 136 and amplifier 138 are generally referred to as a multiplying digital-to-analog converter (MDAC) which is collectively shown as the broken-line element 140. Generally, one or more redundant bits are generated in the converter stages and the control and correction logic 128 includes circuits (e.g., full adders) that use the bits of succeeding stages to correct preceding-stage errors that result from various degrading effects (e.g., offset and/or gain errors) and also includes circuits (e.g., shift registers) that time-align the corresponding digital bits.

Although clock embodiments have been illustrated with metal-oxide-semiconductor transistors, other embodiments may be formed with different transistors (e.g., bipolar junction transistors).

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A converter that converts an input signal to a clock signal, comprising:

a frequency divider that is configured to respond to an input signal which changes states at first times and provide a second signal which has a second frequency which is lowered from the input frequency of said input signal and which changes states at second times that differ from said first times; and a gate that passes said second signal in response to said input signal to thereby generate said clock signal.

2. The converter of claim 1, wherein said gate includes:

an inverter driven by said divider and having first and second output terminals; and first and second transmission gates coupled between said output terminals and driven by said input signal.

3. The converter of claim 1, further including a filter inserted before said divider to filter said input signal.

4. The converter of claim 1, wherein each of said second times is positioned between an adjacent pair of said first times.

5. The converter of claim 4, wherein said divider includes a delay-locked loop that is incorporated to maintain the positioned relationship of said first and second times.

6. The converter of claim 1, further including a buffer amplifier that drives said divider and said gate in response to said input signal.

7. The converter of claim 1, further including an output buffer amplifier arranged to conduct said reference signal away from said gate.

8. A clock source that provides a clock signal; comprising:

a signal generator that generates a first signal which has a first frequency and changes states at first times;

a frequency divider that is configured to respond to said first signal to provide a second signal which has a second frequency lowered from said first frequency and which changes states at second times that differ from said first times; and a gate that passes said second signal in response to said input signal to thereby generate said clock signal.

9. The source of claim 8, wherein said generator includes:
a crystal oscillator; and
a voltage-controlled oscillator that provides said first signal and is phase locked to said crystal oscillator.

10. The source of claim 8, wherein said gate includes:
an inverter driven by said divider and having first and second output terminals; and
first and second transmission gates coupled between said output terminals and driven by said first signal.

11. The source of claim 8, further including a filter inserted between said signal generator and said divider to filter said first signal.

12. The source of claim 8, wherein each of said second times is positioned between an adjacent pair of said first times.

13. The source of claim 12, wherein said divider includes a delay-locked loop that is incorporated to maintain the positioned relationship of said first and second times.

14. The source of claim 8, further including a buffer amplifier inserted to drive said divider and said gate in response to said first signal.

15. The source of claim 8, further including an output buffer amplifier arranged to conduct said reference signal away from said gate.

16. A method of providing a clock signal, comprising:
providing a first signal that has a first frequency and changes states at first times;
dividing said first signal to provide a second signal which has a second frequency lowered from said first frequency and which changes states at second times that differ from said first times; and
gating said second signal in response to said first signal to thereby generate said clock signal.

17. The method of claim 16, wherein said providing step includes the step of originating said first signal with a crystal oscillator.

18. The method of claim 16, wherein said dividing step includes the step of positioning each of said second times between a respective pair of said first times.

19. The method of claim 16, wherein said gating step includes the steps of:

driving an inverter with said second signal;
with said first signal, commanding at least one transmission gate to pass said second signal from said inverter to thereby generate said reference signal.

20. An analog-to-digital converter that processes an analog signal to a corresponding digital signal, comprising:
a sampler that provides samples of said analog signal in response to a clock signal;
at least one converter stage that successively processes each of said samples to thereby provide said corresponding digital signal;
a signal generator that generates a first signal which has a first frequency and changes states at first times;
a frequency divider that is configured to respond to said first signal to provide a second signal which has a second frequency lowered from said first frequency and which changes states at second times that differ from said first times; and
a gate that passes said second signal in response to said input signal to thereby generate said clock signal.

21. The converter of claim 20, wherein said generator includes:
a crystal oscillator; and
a voltage-controlled oscillator that provides said first signal and is phase locked to said crystal oscillator.

22. The converter of claim 20, wherein said gate includes:
an inverter driven by said divider and having first and second output terminals; and
first and second transmission gates coupled between said output terminals and driven by said first signal.

23. The converter of claim 20, wherein each of said second times is positioned between an adjacent pair of said first times.

24. The converter of claim 20, wherein said converter stage comprises
a first converter stage that converts said samples to first digital bits and a residue signal;
a second converter stage that converts said residue signal to second digital bits; and
a controller that provides said digital signal in response to said first and second digital bits.

* * * * *